S. H. SHAW.
AUTOMOBILE BUMPER.
APPLICATION FILED JUNE 7, 1918.

1,363,927.

Patented Dec. 28, 1920.
3 SHEETS—SHEET 1.

Inventor
SAMUEL H. SHAW
By his Attorneys

S. H. SHAW.
AUTOMOBILE BUMPER.
APPLICATION FILED JUNE 7, 1918.

1,363,927.

Patented Dec. 28, 1920.
3 SHEETS—SHEET 2.

Inventor
SAMUEL H. SHAW
By his Attorneys

S. H. SHAW.
AUTOMOBILE BUMPER.
APPLICATION FILED JUNE 7, 1918.
1,363,927.
Patented Dec. 28, 1920.
3 SHEETS—SHEET 3.
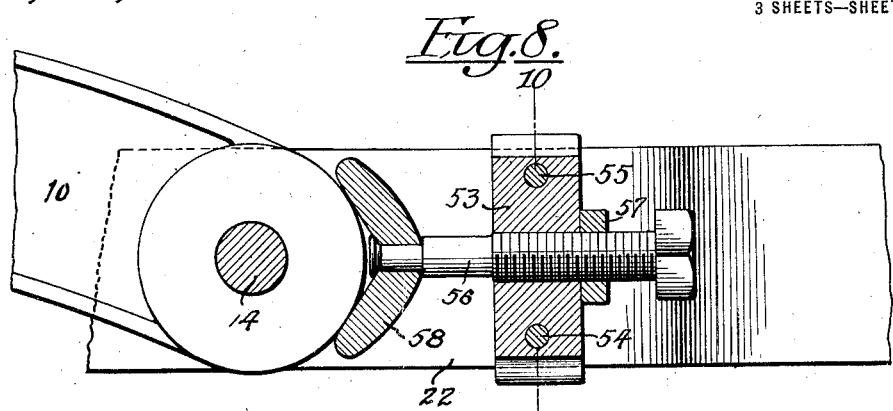
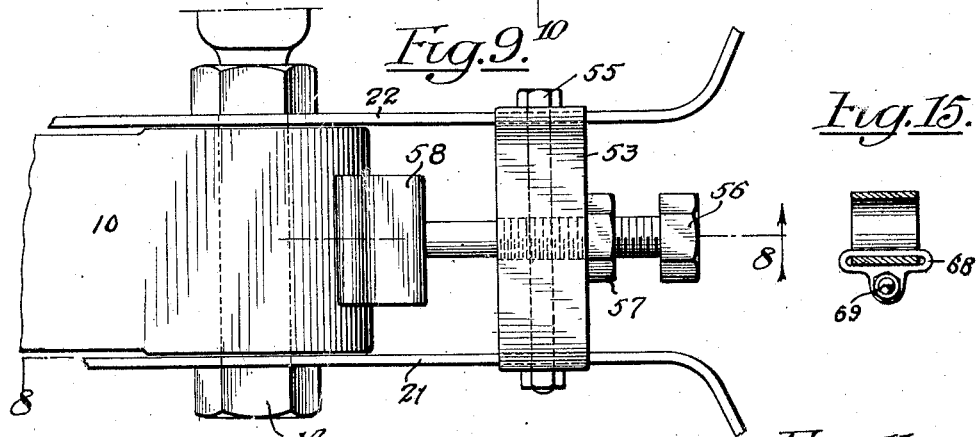
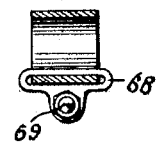
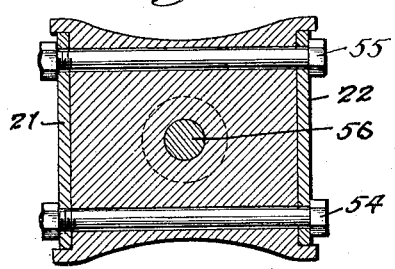
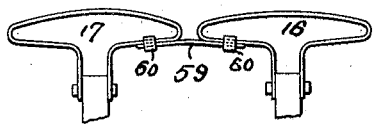
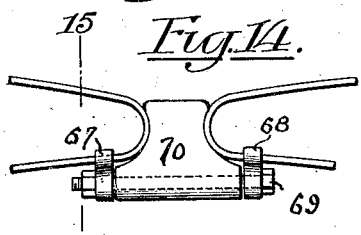
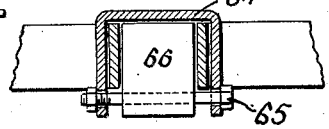
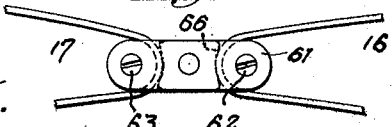
Inventor
SAMUEL H. SHAW
By his Attorneys

UNITED STATES PATENT OFFICE.

SAMUEL H. SHAW, OF NEW YORK, N. Y., ASSIGNOR TO INGLIS M. UPPERCU, OF NEW YORK, N. Y.

AUTOMOBILE-BUMPER.

1,363,927.	Specification of Letters Patent.	Patented Dec. 28, 1920.

Application filed June 7, 1918. Serial No. 238,669.

*To all whom it may concern:*

Be it known that I, SAMUEL H. SHAW, a citizen of the United States of America, residing in the city, county, and State of New York, have invented certain new and useful Improvements in Automobile-Bumpers, of which the following is a specification.

My invention relates to automobile bumpers, and the object of my invention is to provide a bumper of improved construction which is not only strong but light, readily made and attached, adaptable to all car constructions, and efficient in operation.

In the accompanying drawings,

Fig. 8 is a longitudinal section through a portion of the bumper showing the thrust saddle and spacing block;

Fig. 9 is a plan thereof;

Fig. 10 is a section on the line 10—10, Fig. 8;

Fig. 11 is a plan showing a modified connection between the bumper members;

Fig. 12 is a side elevation of a further modification thereof;

Fig. 13 is a vertical section through another modification;

Figs. 14 and 15 are plan and vertical section, respectively, of another modification.

Figure 1:
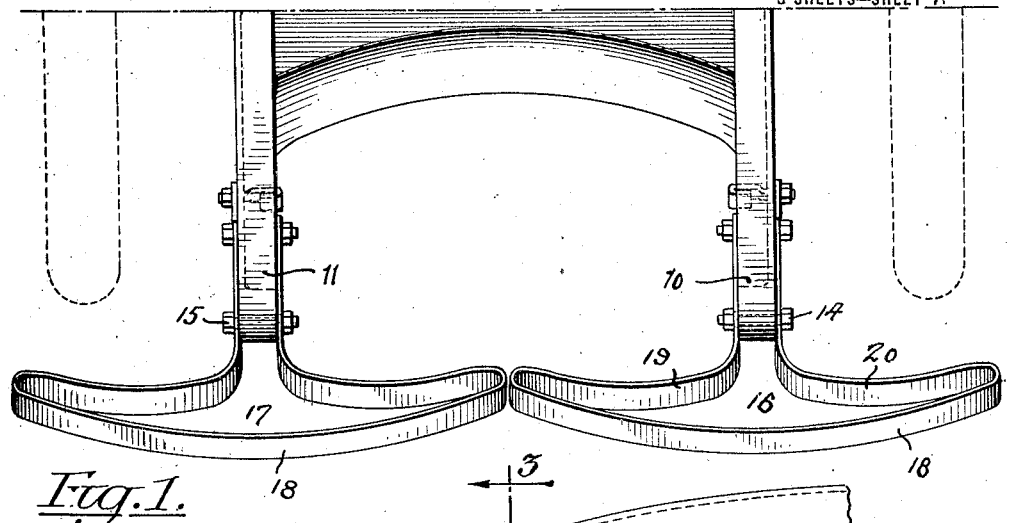
Figure 1 is a front perspective of a bumper in which my invention is embodied in one form.
Figure 2:
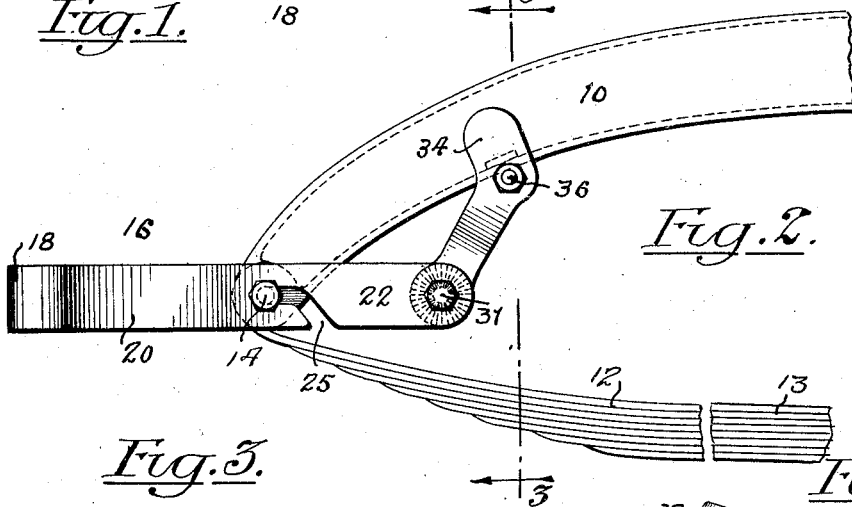
Fig. 2 is a side elevation thereof.
Figure 3:
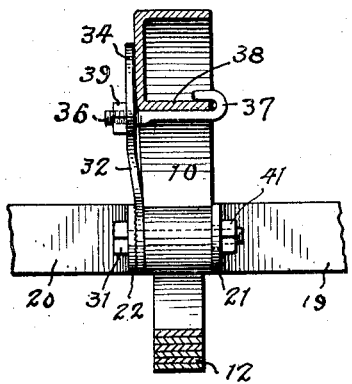
Fig. 3 is a section on the line 3—3, Fig. 2.
Figure 4:
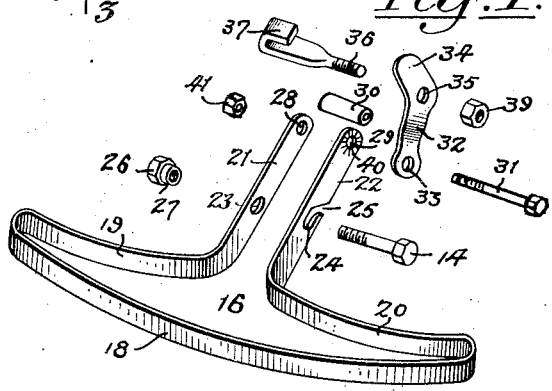
Fig. 4 is an exploded perspective of one of the bumper members.

In the construction illustrated in Figs. 1 to 4 inclusive, I have shown a chassis, the side channel bars of which terminate in the usual forwardly and downwardly projecting horns 10 and 11 to which the ends of the usual leaf springs 12 and 13 are connected by the spring bolts 14 and 15. Instead of the usual single cross bar bumper extending across the front of the car and supported at its opposite ends from the two horns 10 and 11, I have provided two independent bumper members 16 and 17. Each member is here shown formed from a strap of flat spring steel or other suitable metal bent to shape. In the preferred form, each member has a slightly convexed impact reach 18 terminating in ogee spring bends 19 and 20. These spring bends not only approach each other but terminate in straight supporting arms 21 and 22 spaced apart and embracing between them a chassis horn 10 or 11. These supporting arms may be secured to the horn in any suitable way and, irrespective of the manner of attachment, the bumper members 16 and 17 constitute an important feature of my invention.

Figure 7:
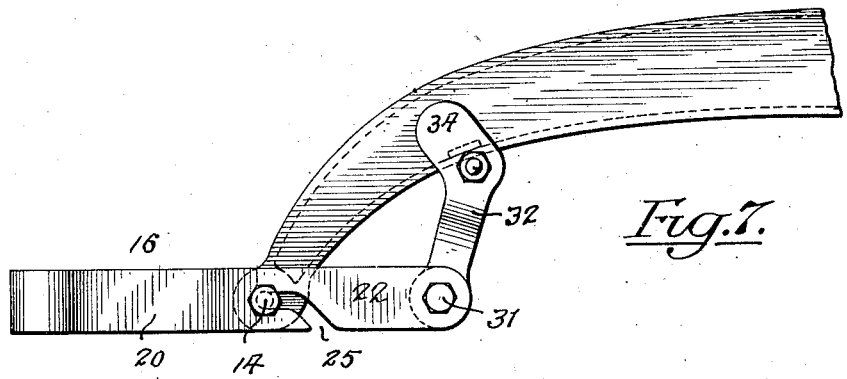
Fig. 7 is a side elevation corresponding to Fig. 2 but showing a chassis horn of different shape.

The method of attachment here illustrated by way of example is, however, not only inexpensive but also convenient and efficient. I use for this purpose the spring bolts 14 and 15 for the respective bumper members, each of which has its supporting arms 21 and 22 pierced at 23—24 to receive one of the spring bolts. Preferably the piercing 24 constitutes a portion of a bayonet slot 25 extending through the lower edge of the supporting arm 22, since this makes it possible to mount the bumper on the spring bolt without completely withdrawing the latter. By driving the bolt out sufficiently to enable its shank to enter the slot 25, the arm 22 may be slipped into position between the bolt head and the side of the horn 10, and the other arm may be then sprung over the bolt end. A nut 26 having a bushing sleeve 27 which enters the hole 23 in the arm 21, is then screwed on the bolt end and the supporting arms 21—22 are thus clamped firmly to the opposite sides of the chassis horn. The inner ends of the arms are pierced in register at 28 and 29 and spaced apart by a bushing 30, through which passes the bolt 31. Beneath the head of the latter is clamped the lower end of a strut 32 pierced at 33 to receive the bolt 31. The upper end of the strut has an offset flange 34 which rests against the outer face of the horn 10 and is pierced below the horn at 35 to receive the bolt 36. The shank of the latter is flattened and recurved to form a hook 37 which engages the lower flange 38 of the horn, so that upon the tightening of the nut 39, the strut is firmly clamped in position. Obviously, by shifting the upper end of the strut 32 along the curved horn 10, the angular position of the bumper member 17 is varied, and it is thus possible to bring the latter into horizontal position without difficulty. It also makes possible the adjustment of the bumper on various types of chassis horns. Thus, in Fig. 7 I have shown a horn of extreme downward curvature to which the bumper is attached without difficulty in horizontal position by changing the angular relationship between the strut and the supporting arm. In order to maintain the strut in its adjusted position, the inner face of its lower end is preferably knurled as is also the opposed face of arm 22 to form teeth 40 which are interlocked when the nut 41 of bolt 31 is screwed down hard. It will be observed that this fastening device requires no punching or boring of holes in the chassis, nor any disturbance of the spring bolt other than a slight withdrawal to permit the arm 32 to be passed down between the bolt head and the side of the chassis horn. In the form here shown, thrust strains incident to impact against the bumper are taken by the spring bolt (which is always very strong) and also by the strut 32 which transmits the strain to the chassis horn to which it is securely anchored.

The construction has many advantages over the usual type of bumper in which a bar is carried across the front of the car and supported at its opposite ends. Inasmuch as each member of the present bumper is less than half the width of the usual bumper bar, it is lighter and, with the same material, is stronger, since the distance between the supports is less. It is supported not at its ends but from a point midway between its ends. It is brought close to the chassis, thus lessening the vibration and the strains incident thereto. Its supporting arms straddle the chassis horn, thus giving a firm support at points spaced apart. At the same time, its central support permits it to yield in all directions without undue strain on any part. the two independent members share equally the strain of a frontal impact, while, under tangential impact, one member is deflected into engagement with the other and thus reinforced by the latter. Moreover, in case of injury to one member through side swipe or back hook, the bumper as a whole need not be replaced but merely the member which has been injured. The bumper members proper may be readily shaped from spring strap metal, and the strut 32 may be stamped to shape, while the various bolts employed are standard articles of manufacture and may be readily purchased at any time on the market. It will be sufficiently clear that the construction is one of great economy of manufacture, and may be marketed at a figure much lower than that now prevalent for bumpers of equal capacity.

Figure 5:
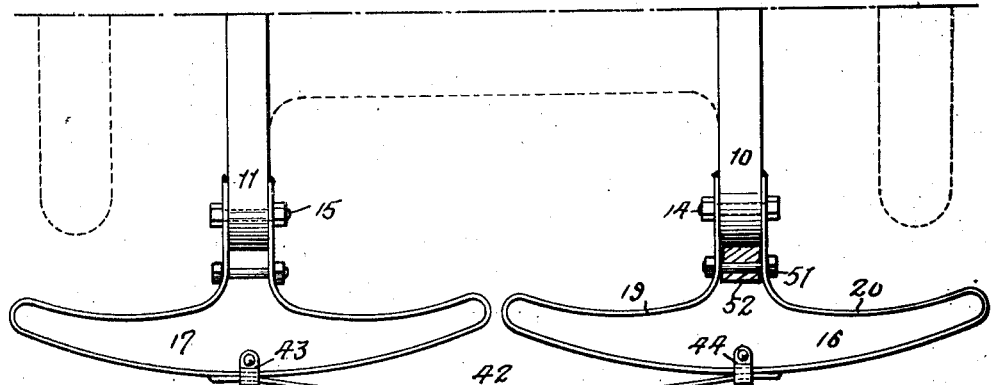
Fig. 5 is a plan of a modified construction.

The modification illustrated in Fig. 5 differs from that above described only in that a bridge or tie bar 42 is stretched between the mid points of the two bumper members 16 and 17, and is secured thereto by the clips 43—44. This bridge member 42 is of flat spring metal, slightly convexed, and adds strength to the bumper. In case of front impact it takes the initial strains. In case of side impact it immediately transmits the strains from one member to the other, and thus more evenly distributes the stresses upon the two bumper members. This bridge or tie member 42 is not necessary on bumpers for cars of light weight, although it is desirable in all cases.

Figure 6:
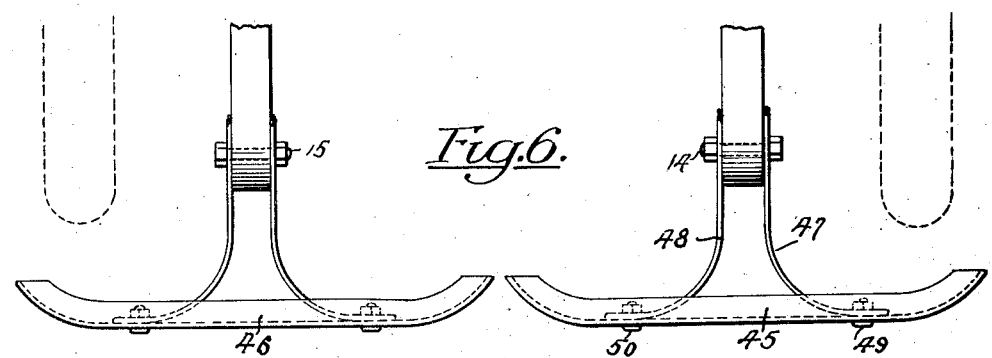
Fig. 6 is a plan of another modified construction.

In Fig. 6 I have shown a further modification in which the impact elements 45 and 46 of the bumper members are of channel iron. Each impact member is supported in front of a chassis horn by a pair of spring arms 47 and 48, corresponding to the spring arms 19 and 20 of the bumper members first described. They are anchored at their inner ends to the chassis horns in the same manner as above described, but at their outer ends lie within the channel 45 or 46, to which they are bolted at 49 and 50.

In the constructions above described, as pointed out, the stress of impact against the bumper is taken by the spring bolts 14 and 15. While these are always strong, it is desirable to relieve them of unnecessary strain, and I have therefore provided a thrust member which is applicable to any of the constructions above referred to. I have shown in Fig. 5 a tie bolt 51 connecting the supporting arms 21 and 22 at a point in front of the chassis horn. This bolt somewhat strengthens the spring arms 19 and 20, and I may, as there indicated, mount on this bolt a thrust block 52 which bears against the end of the chassis horn to transmit to the latter the impact strains and relieve the spring bolt 14 therefrom. I prefer, however, a construction such as illustrated in Figs. 8, 9, and 10, in which the arms 20 and 21 are rigidly connected to a spacing block 53 spaced outward from the chassis horn and held in position by transverse bolts 54 and 55 which pierce the supporting arms 21 and 22. This block is provided with a central tap bore through which threads the thrust screw 56 provided with a lock nut 57. At the inner end of the thrust screw is a thrust saddle 58 which bears against the end of the chassis horn 10. This saddle 58 is in swiveling engagement with the thrust screw 56, and is preferably of V-shape on its inner face so that it will accommodate itself to the end of the chassis horn 10, whatever curvature the latter may have. It is obvious that, by the use of this thrust device, the strains upon the bumper are transmitted not to the spring bolts 14 or 15, but to the chassis horn which is, of course, sufficiently strong to withstand any strains from which the bumper may be expected to protect the vehicle.

In Fig. 11 I have shown a modified bridge or tie piece embodying certain of the functions of the strap 42 of Fig. 5, but differing therefrom in that it is arranged not in front of the impact members 16 and 17, but behind the latter. As here shown, the tie strap 59 is of spring steel plate, substantially corresponding to that of the metal from which the bumper members 16 and 17 are made, and secured to the inner spring arms 19 by clips 60 clamped thereto. It is obvious that while this tie plate 59 does not form an impact member, it does serve to transmit the strains from one member to the other, so that the latter reinforce each other under all conditions.

In the remaining figures I have shown different types of tie connections between the members 16 and 17. Thus, in Fig. 12 I have shown them connected by a link 61 extending between the adjacent curved ends of the two members and secured in place by bolts 62 and 63 which lie in the end bends. In Fig. 13 I have shown a clip 64, the legs of which pass down through the end bends and are united below the latter by a cross pin or bolts 65. In both cases a spacer block 66 is employed to fill the space between the end bends. In Figs. 14 and 15 I have illustrated a further modification in which clips 67 and 68 are slipped on the bumper members and brought to their adjacent end bends where they are united by a bolt 69 which also holds in place the spacer block 70.

Various modifications in detail of construction will readily occur to those skilled in the art which do not depart from what I claim as my invention. The underlying thought of the invention contemplates the provision of two independent bumper members of like construction and each of a general T-shape, centrally secured to spring arms at the ends of the respective side bars of the chassis. The impact elements of each member are of such shape and extent that their inner ends approach each other at the mid plane of the car, while at their outer ends they protect the wheels, thus presenting, in effect, a continuous bumper protection from side to side of the car, while, at the same, having the advantages of rigidity of support, lightness and strength incident to their independence of construction and mounting. Subsidiary thereto are the elements of, first, support by means of the spring bolt and adjustable clamp strut, second, cross tie between the buffer members to equalize the strains thereon under various impact conditions, and, third, chassis thrust device to relieve the supporting spring pin and clamp from impact strains. Obviously the bumper is applicable to the rear of the car as well as to the front and acts in like manner in either position. It is clear, furthermore, that in the following claims I speak of impact members to denote the impact stretches 18 of the bumper members 16 and 17, whether or not a tie such as 42 be present, and that this term is properly descriptive since the bridge or tie piece 42 would take only central impact and neither a glancing side impact nor a side hook.

I claim:—

1. An automobile bumper comprising a pair of impact members, each having a pair of spring supporting arms and means for securing the same to the opposite sides of a chassis side bar.

2. An automobile bumper comprising a pair of impact members, each member having a spring support secured to the end of a chassis side bar and extending symmetrically on opposite sides of the vertical plane of said side bar and reaching from a point in front of the wheels on one side of the chassis to a point adjacent the mid plane of the chassis.

3. An automobile bumper comprising a pair of impact members, each impact member having a pair of spring arms embracing the end of a chassis side bar and extending in opposite directions therefrom toward the opposite ends of said impact member.

4. An automobile bumper comprising a pair of impact members of generally T-shape, each member having the leg of the T secured to a side bar of the chassis and the head of the T extending symmetrically on opposite sides of the plane of said side bar the adjacent ends of said impact members closely approaching the mid plane of the chassis to afford substantially continuous transverse protection for the car.

5. An automobile bumper comprising a pair of impact members of generally T-shape, means for supporting the leg of each T member upon the spring bolt at the end of the chassis side bar, and means for adjustably securing each member in horizontal position.

6. An automobile bumper comprising a pair of impact members of a general T-shape, bolt means for supporting each member upon the respective chassis side bars, together with thrust means bearing against the chassis side bars to relieve the supporting bolts from thrust strains.

7. An automobile bumper comprising an impact member, bolt means for supporting the same on the chassis, and independent thrust means bearing against the chassis to relieve the supporting bolts from thrust strains.

8. An automobile bumper comprising an impact member having a pair of spring arms extending therefrom to a chassis side bar and a thrust device engaging said arms and bearing against the chassis side bar to relieve the supporting bolts from thrust strains.

9. An automobile bumper comprising an impact member having a pair of supporting arms, a spacing block engaged between said supporting arms, and a thrust device carried by said spacing block and engaging the chassis side bar to transmit thrust strains directly to the latter and relieve the supporting bolts.

10. An automobile bumper comprising an impact member, a pair of spring arms extending therefrom to a chassis side bar and pivoted thereto together with adjustable means for holding said bumper in position.

11. An automobile bumper comprising an impact member having a pair of supporting arms pivoted on the spring bolt at the end of the chassis side bar and a strut member extending from the inner ends of said spring arms to a point beyond said spring bolt, together with an adjustable clamp for securing said strut to the chassis side bar.

12. An automobile bumper comprising a pair of impact members each extending from a point in front of the wheels to a point adjacent the mid plane of the chassis, a pair of spring arms extending from the opposite ends of said impact members to the respective side bars of the chassis, and tie means of materially less length than the bumper and extending between said impact members to reinforce each other under stress.

13. An automobile bumper comprising a pair of impact members each extending from a point in front of the wheels to a point adjacent the mid plane of the chassis, a pair of spring arms extending from the opposite ends of each of said impact members to the respective side bars of the chassis, and tie means extending between said impact members to reinforce each other under stress, said tie means comprising a strap extending between the mid portions of said impact members and secured thereto, but leaving the outer end portion of said impact members exposed to impact.

14. An automobile bumper comprising a pair of impact members each convex in shape and each extending from a point in front of the wheels to a point adjacent the mid plane of the chassis, a pair of spring arms extending from the opposite ends of each of said impact members to the respective side bars of the chassis, and tie means extending between said impact members to reinforce each other under stress, said tie means comprising a spring strap convexed in a curve substantially conforming to that of the impact members and extending between the mid portions of said impact members and secured thereto.

15. An automobile bumper comprising a pair of impact members each extending from a point in front of the wheels to a point adjacent the mid plane of the chassis, a pair of spring arms extending from the opposite ends of each of said impact members to the respective side bars of the chassis, and tie means extending between said impact members to reinforce each other under stress, said tie means comprising a spring strap extending between the mid portions of said impact members and secured thereto.

16. An automobile bumper comprising a pair of impact members each extending from a point in front of the wheels to a point adjacent the mid plane of the chassis, a pair of spring arms extending from the opposite ends of each of said impact members to the respective side bars of the chassis, and tie means extending between said impact members to reinforce each other under stress, said tie means comprising a convexed spring strap extending between the mid portions of said impact members and secured thereto.

17. For use with an automobile having chassis side bars, a bumper comprising as an element thereof a one piece spring strap having a convexed front mid area and re-curved ends approaching each other and straddling the chassis side bar, together with means for securing said bumper ends thereto.

18. For use with an automobile having chassis side bars and transverse spring bolts in the ends thereof, an automobile bumper comprising as an element thereof a one piece spring strap having a convexed front mid area and re-curved ends approaching each other and straddling the chassis side bar, together with means for engaging said ends upon the opposite ends of the spring bolt.

19. An automobile bumper, comprising a one piece impact member having re-curved ends adapted to straddle the chassis side bar, and means for engaging said ends on the chassis spring bolt.

In testimony whereof I have signed my name to this specification.

SAMUEL H. SHAW.